Aug. 23, 1960 C. W. VOGT 2,949,713
METHOD AND APPARATUS FOR FORMING AND FILLING PACKAGES
Filed May 18, 1956 3 Sheets-Sheet 1
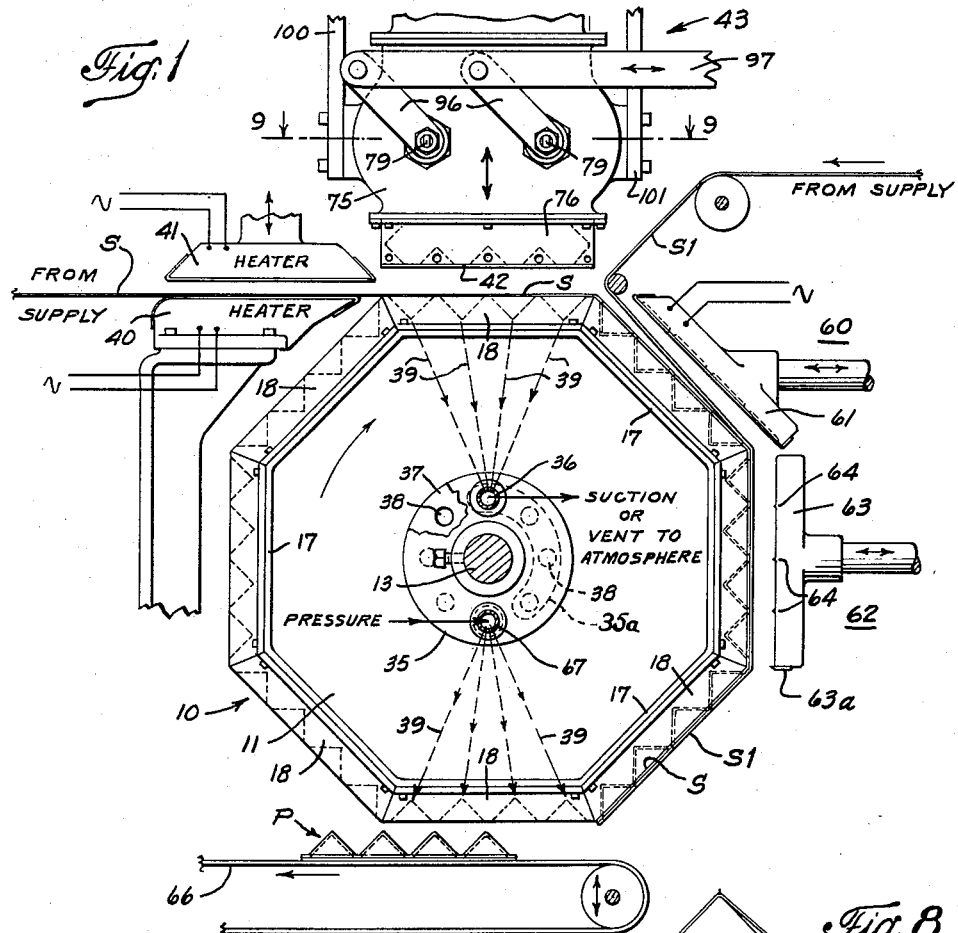
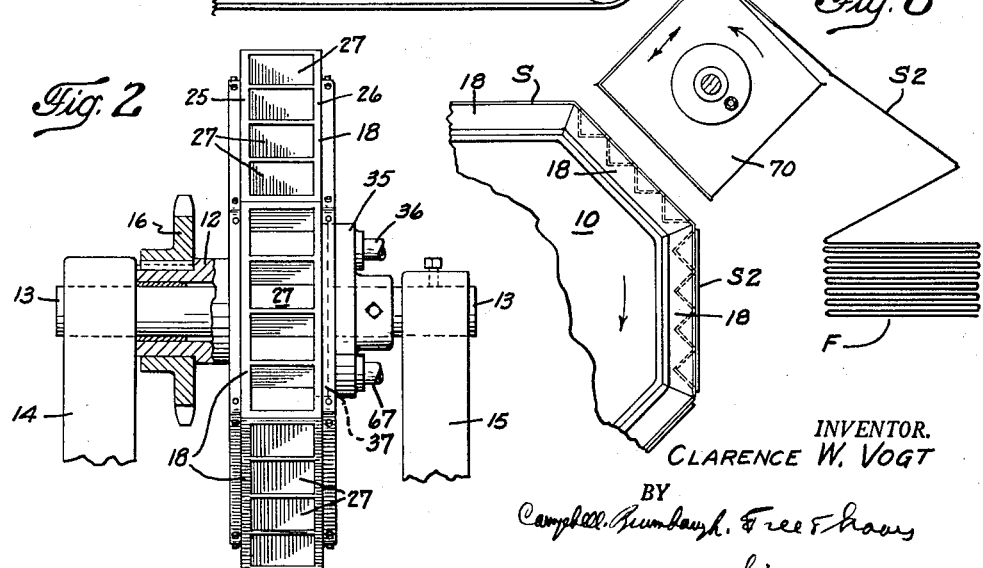
INVENTOR.
CLARENCE W. VOGT
BY
his ATTORNEYS Aug. 23, 1960  C. W. VOGT  2,949,713
METHOD AND APPARATUS FOR FORMING AND FILLING PACKAGES
Filed May 18, 1956  3 Sheets-Sheet 2
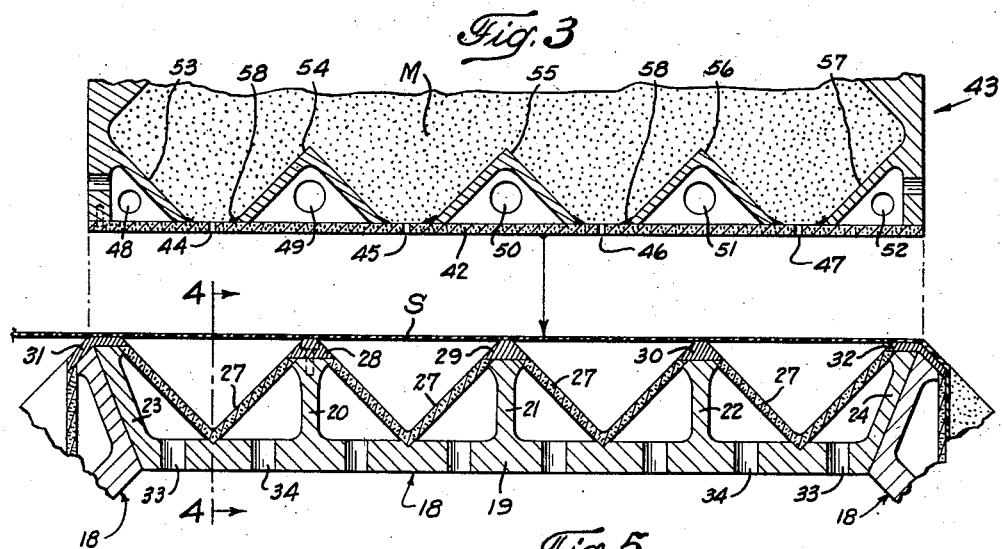
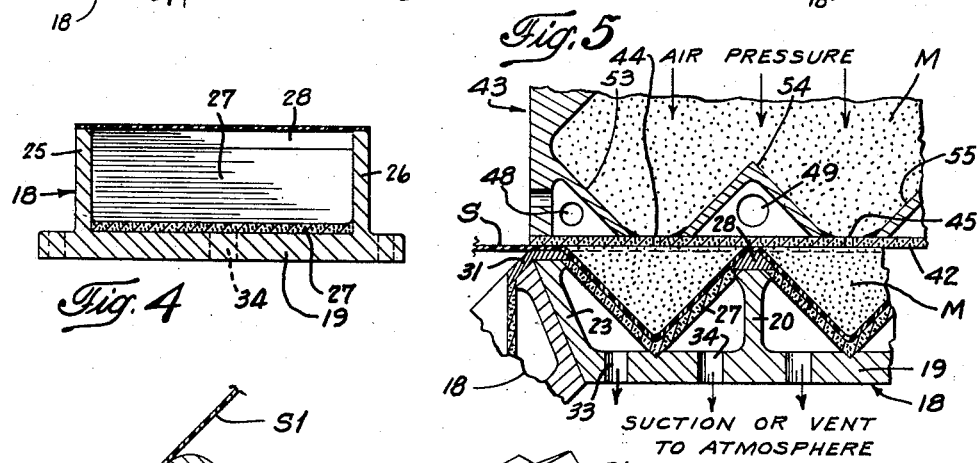
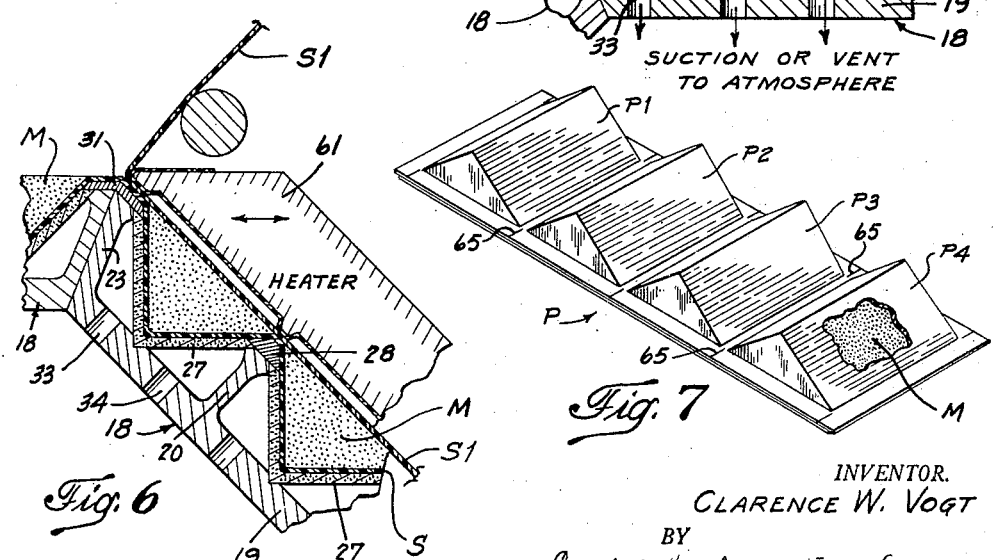
INVENTOR.
CLARENCE W. VOGT
BY
his ATTORNEYS Aug. 23, 1960 C. W. VOGT 2,949,713
METHOD AND APPARATUS FOR FORMING AND FILLING PACKAGES
Filed May 18, 1956 3 Sheets-Sheet 3
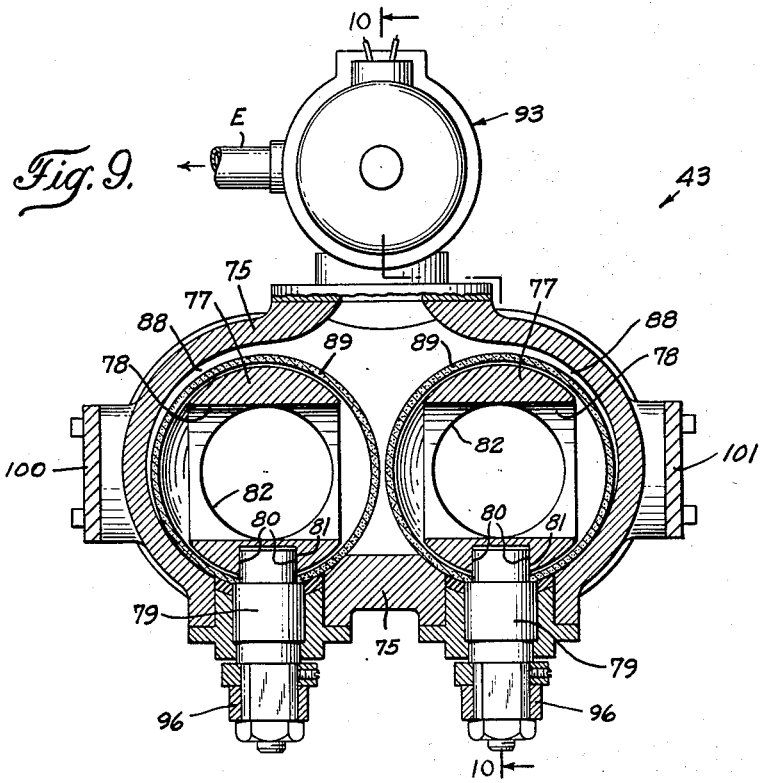
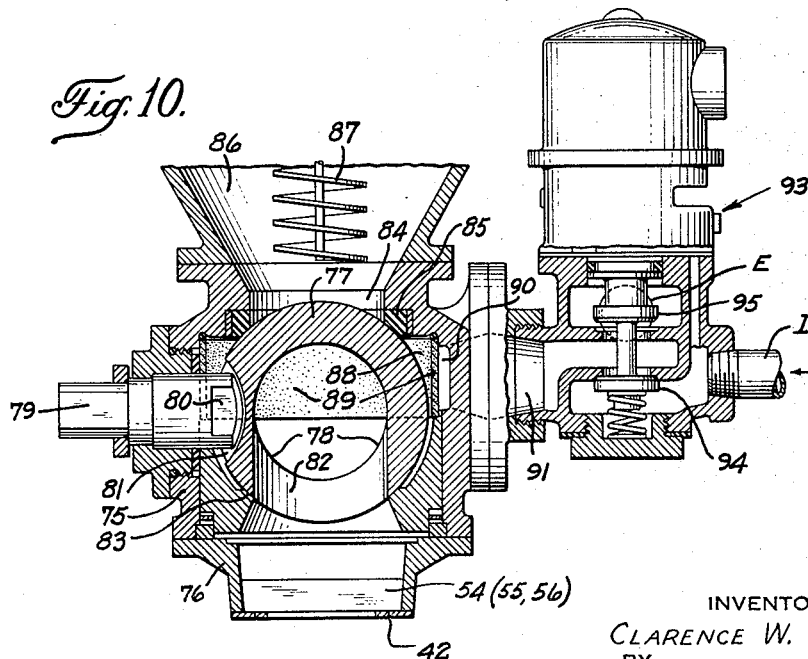
INVENTOR
CLARENCE W. VOGT

United States Patent Office 2,949,713
Patented Aug. 23, 1960

2,949,713

METHOD AND APPARATUS FOR FORMING AND FILLING PACKAGES

Clarence W. Vogt, Watson, Conn.
(Rte. 4, Westport, Conn.)

Filed May 18, 1956, Ser. No. 585,775

15 Claims. (Cl. 53—29)

This invention relates to methods and apparatus for forming and filling packages and it relates more particularly to methods and apparatus by means of which finely divided, powdered, granular and other materials, such as flour, cake mixes, pie-crust mixes and the like, can be introduced into enwrapments therefor with a high degree of uniformity in the density and weight of the material in the packages.

As disclosed in my co-pending application Serial No. 556,158, filed December 27, 1955, I have discovered that it is possible through the use of a suitable apparatus to introduce uniform quantities of powdered or fluent materials into a wrapper or enwrapment and to form prism-like packages.

The present invention constitutes an improvement over the above-described methods and apparatus in that it provides a simplified method and apparatus for forming or shaping the enwrapments or wrappers and introducing the fluent or powdery material into the packages.

More particularly, the methods and apparatus involve procedures and mechanisms whereby an initially flat sheet of thermoplastic material is deformed to form pockets in the sheet of predetermined shape into which the material is blown by the blowing head, the pockets then being sealed by covering the pockets with another sheet of material and uniting the sheets by means of adhesive or by the application of heat and pressure thereto.

The above-described method and apparatus do away with the need for mechanism for folding the end portions of wrappers to form the cavities for receiving the folded material and they make unnecessary the use of stiffening reinforcements attached to the sheets to enable the sheets to be folded. As a result, the packages can be formed rapidly and at low cost and a plurality of joined packages can be formed which can be folded in such a manner as to form a composite or multi-unit package that may be readily stored and transported.

For a better understanding of the present invention, reference may be had to the accompanying drawings in which:

Figure 1 is a schematic showing of a typical apparatus embodying the present invention and for practicing the method;

Figure 2 is an end elevational view of the molding wheel with parts broken away to disclose details of construction;

Figure 3 is a view in longitudinal section through a portion of the mold wheel and the blowing head shown in a separated position;

Figure 4 is a view in section taken on line 4—4 of Figure 3;

Figure 5 is a view in longitudinal section through a portion of the blowing head and the mold wheel showing them in engaged position and illustrating the filling operation;

Figure 6 is a view in longitudinal section through a portion of a mold wheel and the sealing head illustrating the operation of the sealing head while applying a closure sheet to the filled packages;

Figure 7 is a perspective view of a multi-unit package produced by the filling device shown in Figure 1;

Figure 8 is a view of a portion of the molding wheel and a modified form of sealing head for applying a sealing strip to the open sides of the packages;

Figure 9 is a view in cross section taken on line 9—9 of Figure 1; and

Figure 10 is a view in cross section taken on line 10—10 of Figure 9.

The apparatus illustrated in the drawings is constructed and arranged to produce a multi-unit package P including a plurality of units such as the four units P1, P2, P3 and P4 illustrated. Each of the units is generally wedge-shaped, that is, it is triangular in cross section and has three rectangular sides. Narrow webs connect the units to enable the package P to be folded at the webs which serve as hinges to form a package of generally square cross section, as disclosed more particularly in my co-pending application Serial No. 585,774, filed on even date. A typical apparatus includes a rotary mold or molding wheel 10 which, as illustrated, is of octagonal shape and includes an octagonal wheel portion 11 provided with a hub 12 which is rotatably mounted on a shaft 13 extending between a pair of standards or uprights 14 and 15. The hub is rotated intermittently by means of a sprocket 16 fixed thereto and by an intermittent drive mechanism such as, for example, a pawl and ratchet, Geneva movement or the like (not shown)

Mounted around the rim 17 of the wheel portion 11 are eight mold elements 18, all of which are alike so that only one of them will be described herein. As best shown in Figure 3, each mold element 18 includes a base plate 19 having a plurality of spaced, parallel ribs 20, 21 and 22 extending outwardly therefrom and diverging end flanges 23 and 24 which abut against corresponding end flanges of the mold elements 18 on opposite sides thereof. Each base plate 19 is also provided with opposite side flanges 25 and 26. Molding cavities are formed between the flange 23 and rib 20, the ribs 20 and 21, the ribs 21 and 22 and the rib 22 and end flange 24 by means of trough-like elements 27 of V-shaped cross section formed of porous metal such as sintered bronze powder or the like. The trough-like elements 27 are retained in position by means of trapezoidal cap pieces 28, 29 and 30 screwed or otherwise secured to the upper ends of ribs 20, 21 and 22, and by means of the cover flanges 31 and 32 which overlap the joints between adjacent mold elements 18 and the edges of the adjacent elements 27.

As illustrated in Figure 5, the base plate 19 is provided with apertures 33 and 34 to enable air to escape or be drawn through mold-cavity forming elements 27. The apertures 33 and 34 may communicate directly with atmosphere. However, as illustrated in Figures 1 and 2, a manifold 35 is fixed to the shaft 13 and is connected to a source of reduced pressure by means of a port 36 leading into the upper section of the manifold. A disk portion 37 having a plurality of ports 38 each corresponding to a mold section 18 is in slidable, air-tight relation to the manifold and each port is connected to the apertures 33 and 34 of a mold unit by means of pipes or conduits 39 illustrated by the dotted lines in Figure 1 so that a reduced pressure can be exerted on the backs of the elements 27. The inner face of manifold 35 may be provided with an arcuate recess 35a whereby suction may be applied simultaneously through port 36 to a desired number of mold elements 18 such as four in the illustrated form, As illustrated in Figure 1, a thin sheet of thermoplastic material S such as, for example, polyethylene, "Mylar," polyvinylidene resin or the like, is delivered from a supply source between a pair of electric heater elements 40 and 41, the uppermost heater being mounted to move into contact with and away from the sheet in order to heat it sufficiently to render it plastic and deformable. To prevent sticking of the sheet to the heaters, the surfaces of the heaters may be coated with "Teflon" (tetrafluoroethylene polymer) or other adhesion-resistant material. A section of the sheet S in a plastic condition is disposed in a position overlying the face of the mold 18 as illustrated in Figure 3. Suction exerted through the apertures 33 and 34 behind the porous mold elements 27 or pressure exerted on the upper surface of the softened and deformable sheet material S or both causes the sheet to be forced down into conformity with the porous elements 27. In operation, the edges of the sheet and the portions overlying clamping blocks 28, 29, 30, 31 and 32 are clamped between these blocks and the porous plate 42 forming the bottom of the blowing head 43 of the apparatus so that pneumatic deformation of the sheet as illustrated in Figures 5 and 7 will cause the formation of wedge-shaped receptacles in the sheet material. The formation of the receptacles is aided by the introduction of the filling material because filling is performed under pneumatic pressure. As illustrated in Figures 3 and 5, pneumatic pressure on top of the body of the powdered material M causes it to be forced through the apertures 44, 45, 46 and 47, while the air displaced by the introduction of the powdered material under pressure can escape through the porous plate 42 and the vents 48, 49, 50, 51 and 52 which are shielded by the inverted triangular or inclined guide elements 53, 54, 55, 56 and 57 in the bottom of the blowing head 43. Tight joints are formed between the edges of guide elements and the plate 42 by means of fillets 58 of solder or the like, which, however, leave sections of the porous plate 42 uncovered around the openings 44 to 47 through which gas in the interstices of the material can escape to increase the compactness or tightness of the material above and immediately adjacent to the apertures 44 to 47 to prevent sifting of the material during the intervals between successive blowings. Compaction of the material increases the initial velocity of the material through the apertures 44 to 47 inasmuch as it allows the pressure to build up slightly before the material starts to flow through the apertures 44 to 47. The inclined surfaces form downwardly converging channels for directing the powdered material into the package. In this way, and as illustrated in Figure 5, the desired shaping and deformation of the sheet S to form a plurality of wedge-like cavities or receptacles takes place, together with introduction of the material. The powdered material also serves to cool the heated plastic sheet so that it tends to set or harden the deformed sheet.

It will be understood that the sheet may be shaped other than as described to produce receptacles for receiving the powdered material. Thus, it is possible to pre-form the sheet so that it can be fed directly into the mold cavities or to form the cavities in the sheet before it moves into the position directly below the blowing head 43 by preheating the sheet and then clamping it and blowing or sucking the sheet into the mold cavities. In any event, the filled receptacles with their tops open are next delivered to a sealing stage 60, where a second sheet S1 of cover material is delivered from a supply source into overlapping relation to the filled and formed portion of the sheet S. The cover sheet S1 is pressed against the outer surface of the sheet S as shown in Figure 6, and the heater 61 then bonds or unites the outer sheet S1 to the sheet S at the zones overlying the elements 31, 28, 29, 30 and 32, so as to seal around all of the edges of the wedge-shaped receptacles thereby forming a plurality of package units P1, P2, P3 and P4, all joined together in side-by-side relation. The cover sheet S1 may be made of the same material as the sheet S or it can consist of a sheet of paper provided with a surface coating of a thermoplastic adhesive to enable it to bond to the sheet S to thereby form a completed package. Paper sheets are advantageous for the reason that they are more readily adapted to receive printed matter or ornamentation than is plastic material.

After sealing the package with the heating element, it moves to the cutting stage 62 where a shear member 63, provided with a cut-off blade at one edge 63a and short slitting cutters 64, is forced against the packages to separate the package P in each mold unit from the later-formed packages in succeeding mold units and also form narrow slits 65 in the opposite longitudinal edges of the package to facilitate further treatment.

As the wheel 10 moves to dispose the package P in an upside-down and horizontal position corresponding to the bottom of the wheel, each multi-unit package is discharged onto a conveyor 66 by air pressure applied against the back of the package through the air inlet 67 at the bottom of the manifold 35, the pipes 39, the openings 33, 34 and the porous metal members 27. If desired, the conveyor may be raised to receive the package as it is discharged and lowered to transport the packages away from the wheel 10.

As illustrated in Figure 8, an alternative method of sealing and separating the packages includes feeding the sealing sheet S2 from a fan-folded stack F around a generally square sealing and cutting element 70. As indicated in Figure 8, the element 70 is movable toward and away from the mold wheel and rotates intermittently to dispose the fan-folded sheets in position overlying the open sides of the filled packages. The sheet S2 may be somewhat narrower and shorter than the over-all dimensions of the sheet carried by the mold section, but there should be sufficient overlap at the edges to provide an effective seal around each unit P1, P2, P3, and P4. Also, by providing the corners of the sealing member 70 with knife edges, the individual sheets can be separated from the strip S2 at the instant of sealing and each package P can be separated from the other packages formed in the strip in a single operation. By cutting and sealing simultaneously, the sealing unit maintains contact with the sheet S2 and can continue to withdraw the sheet S2 from the stack.

The filling material can be supplied to the mold element by the apparatus disclosed in my co-pending application Serial No. 556,158, or by the improved form of blowing head shown more particularly in Figures 9 and 10 of the drawings. As will be seen from these drawings, the blowing head includes a box-like housing 75 on which a magazine or frame 76 carrying the perforated plate 42 and division members 54, 55, 56 is mounted. The size and shape of the magazine perforations or slots and baffles or division members may be varied to suit the various sizes, shapes, volume and groupings of the receptacles or containers to be filled during each blowing cycle. Within the housing 75 are one or more control valve elements 77 by means of which the powdered material is supplied to the mold. Each valve element 77 is of a spherical configuration having a diametrical hole 78 through it. Rotation of the valve element is accomplished by means of a shaft 79 extending transversely of the housing 75. Each shaft 79 is rotatably mounted in a side of the housing and is in leak-proof relation thereto. The inner end of the shaft has flats 80 formed on its opposite side to render it non-circular in cross section and the flattened end is received in a slot 81 in a side of the valve member 77 to enable the shaft to rotate the member 77 to dispose the axis of the hole 78 vertically or horizontally. The valve member is further provided with a radial hole 82 which intersects the diametric hole 78, thereby forming a generally T-shaped passage in the valve element. An annular seat 83 above the frame 76 supports the valve element 77 for rotation into and out of communication with an inlet 84 at the top of the casing 75. A rubber sealing ring 85 also engages the valve element 77 to prevent leakage of material from the inlet 84 around the outside of the valve element and air or gas from leaking back into the hopper. While a cylindrical or frusto-conical valve such as is contained in a 3-way cock, could be substituted for the spherical valve, as long as it is provided with a radial hole or aperture which connects with the axial hole forming therewith a T-shaped opening, I have found these types usually require excessive force to operate or otherwise cause excessive leakage due to the difficulty in maintaining the proper type seat.

When the member 77 is rotated to the position shown in Figure 10, the holes 78 and 82 are out of communication with the passage 84 and with the hopper 86 disposed on top of the casing 75. When the valve element 77 is rotated 90°, the diametric hole 78 communicates with the frame 76 and the hopper 86 so that a charge of powdered material can be delivered downwardly into the hole 78 and the interior of the frame 76 either by gravity or by means of a screw conveyor 87 which may be operated intermittently and when the hole 78 is in a position to receive a charge from the hopper.

As shown in Figures 9 and 10, a clearance space 88 is provided between the valve element 77 and the inside of the casing 75 between the sealing ring 85 and the spherical seat 83. Disposed in the upper portion of the clearance space 88 is a ring of sintered or porous metal 89 which forms the inner side of an annular passage 90 communicating with an inlet and outlet port 91 and a solenoid-controlled valve unit 93, having an inlet valve 94 and an exhaust valve 95. Air under pressure is admitted through the inlet conduit I to the valve 94 into the port 91 for discharging powdered material downwardly from the interior of the valve element 77 through the diametrical passage 78 and the radial passage 82. When the solenoid is de-energized, air pressure is relieved through passage 91 and exhaust valve 95, which may open to atmospheric pressure or, if desired, may be connected from E to a vacuum chamber, thereby not only relieving pressure in the magazine and valve element 77, but also accelerating refilling with material from the hopper 85. This is of importance with sticky material such as brown sugar which tends to clog augers, but yields to pneumatic pressure. The ring 89 has an area substantially larger than the combined areas of the opposite ends of the passage 78 so that a large volume of gas at high pressure can be supplied against the surface of the charge of material in the passages 78 and 82 and in the frame 76. The gas is diffused by passing through the porous ring 89 so that channelling of the gas through the powdered material and turbulence above the material are largely eliminated. Moreover, the arrangement of the passages 78 and 82 is such that twice as much port area for gas is provided by the open ends of the passage 78 as the area of the filling opening (one end of the passage 78).

Rotation of each valve element 77 between filling and discharging positions is accomplished by means of a lever 96 on the shaft 79 and a link 97 connecting the lever to a solenoid motor or its equivalent (not shown).

The entire blowing head 43 is moved up and down to engage and disengage the sheet material S disposed between it and the wheel 10 and this can be accomplished by means of suitable supporting brackets 100 and 101 which may be raised and lowered by means of cams, bellcranks, or their equivalents (not shown).

All of the operations with the apparatus will be conducted in timed relation so that the sheet S is heated between the heaters and the wheel is rotated to dispose the sheet beneath the raised blowing head 43, while the latter is being filled with an additional charge from the hopper 86 by means of the feed screw 87. When the wheel 10 comes to a stop, the head 43 is lowered, the valve 77 is rotated by the solenoid 98 to dispose the radial passage 82 downwardly and the diametrical passage 78 horizontally and out of communication with the hopper. The air inlet valve 94 is then opened and air under pressure is introduced into the valve and directed against the top of the powdered material in the blowing head 43 to force the material through the passages 44 to 47 against the sheet S thereby forcing it into the molding cavities 27 and conforming the sheet thereto. Any tendency on the part of the molded cavities formed from sheet S to shrink or to change from their conformation after blowing, is resisted not only by the weight and the tightness of compaction of the material which has been blown into the cavities, but also by the partial vacuum which is maintained on the angular surfaces of the cavities until the cover plate has been tightly sealed. Thereafter, any such shrinking characteristic or "memory" which is possessed by the molded film tends to maintain integrity of the wedge-shaped form and to hold the material more firmly. Thereafter, the air valve 94 is closed and the exhaust valve 95 is opened, and when pressure has been relieved in the blowing head 43, it is raised and the valve elements 77 are rotated to receive an additional charge of filling material. While the blowing head is lowered and the charge is being introduced into the molding cavities, the cutting head 62 and the sealing head 60 are advanced in order to seal a group of packages and to cut them as described above. Also, a completed package is discharged at the bottom of the wheel.

With the blowing head 43 raised for recharging, the wheel rotates one stage to begin another operating cycle.

In this way, an intermittent, high speed forming and filling operation can be accomplished and packages produced in which uniform and essentially equal amounts of material can be packaged and sealed.

It will be understood that while only four units are disclosed as being formed in a package, that the wheel 10 may actually be provided with a plurality of rows of cavities, each row containing fewer or more than the four cavities described and disclosed herein, so that a very large number of units may be formed simultaneously during each charging operation. Moreover, the mold elements 18 can be connected to form a chain mold instead of a rotary mold wheel, as shown, and they can be advanced into filling position and moved through sealing, cutting and discharging positions during movement of the chain. Moreover, by suitably mounting the blowing head 43 for movement in an orbital path which coincides in part with the movement of the chain mold, a continuous forming and filling operation can be obtained.

It will be understood further that the mold cavities do not necessarily have to be triangular cross section. They may be trapezoidal, semi-cylindrical, or of other shape, so long as the packages or units formed therein can be ejected from the mold cavities. Accordingly, it will be understood that the apparatus described and disclosed herein is illustrative of the invention and should not be considered as limiting the scope of the following claims.

I claim:

1. A method of filling a package comprising placing an enwrapment between a mold element having a recess therein and a cover therefor forming with said recess an enclosed mold cavity, introducing fluent material under pressure into said mold cavity between said cover and said enwrapment to expand the latter into conformity with said recess and fill said mold cavity between said cover and said enwrapment with said material, and then applying a closure sheet to and sealing it to said enwrapment.

2. An apparatus for forming and filling packages comprising a mold element having a plurality of molding cavities therein having walls with porous portions through which gas can flow, means for supplying a sheet of deformable material to said mold element in a position overlying said cavities, means disposed in opposition to said mold element for clamping said sheet to said mold element around said cavities and covering said cavities, pneumatic pressure means including said porous wall portions for subjecting opposite sides of said sheet to unequal pressures and deforming said sheet into conformity with said mold cavities to provide material-receiving receptacles in said sheet and means for introducing a fluent material under superatmospheric pressure into said clamped receptacles between said means for covering said cavities and said receptacles, said covering means limiting the amount of material introduced into said receptacles.

3. The apparatus set forth in claim 2 comprising means adjacent to the means for introducing said fluent material for applying a cover sheet to the sheet having said receptacles therein and uniting them around said receptacles.

4. An apparatus for forming and filling packages comprising a mold element having a plurality of molding cavities therein having walls containing porous portions through which gas can flow, means for supplying a sheet of deformable material to said mold element in a position overlying and covering said cavities, means for heating said deformable sheet prior to supplying it to said mold element, means opposing said mold element for clamping said material around said cavities and covering said cavities, means including said porous portions for applying unequal pneumatic pressure to opposite sides of said heated sheet for deforming said sheet into conformity with said molding cavities to form material-receiving receptacles in said sheet having open sides adjacent to said clamping and covering means, means overlying said mold element for introducing a fluent material at superatmospheric pressure between said covering and clamping means and said receptacles to fill them, and means adjacent to said mold element and to said introducing means for applying a cover sheet to said sheet of material and bonding them together around said receptacles to close the latter.

5. The apparatus set forth in claim 4 in which said material introducing means comprises a plurality of small outlets corresponding to said receptacles in said covering and clamping means, a chamber adapted to receive fluent material connected to said openings, and means for applying pneumatic pressure to said material in said chambers to blow it through said outlets into said receptacles.

6. The apparatus set forth in claim 4 comprising means supporting said molding element for movement, and means for moving said molding element relative to said clamping, deforming, material introducing and cover sheet supplying and bonding means for cooperation therewith.

7. An apparatus for forming packages containing fluent material comprising a rotary member having a plurality of molding elements thereon, each molding element having a plurality of molding cavities therein provided with porous walls for flow of gas therethrough, means for supplying a thin sheet of thermoplastic material to said rotary member in a position overlying a molding element thereon, means adjacent to said rotary member for heating and softening said sheet prior to supplying said sheet to said molding element, a filling head overlying said rotary member and having clamping means thereon to engage said softened sheet and clamp it to said molding element around said mold cavities, means in said filling head for forcing fluent material against said sheet under pressure to subject opposite sides of said sheet to unequal pressures and deform portions thereof into conformity with said mold cavity to form receptacles and fill said receptacles with said fluent material, means to apply a cover sheet to said thermoplastic sheet and bond the sheets together around said receptacles to close and seal them, and means to move said rotary member to dispose said molding elements successively adjacent to said filling head and said cover sheet applying and bonding means.

8. An apparatus for forming packages containing fluent material comprising a plurality of molding elements connected in end-to-end relation, each molding element having a plurality of mold cavities therein provided with porous walls to enable gas to flow therethrough, means for moving said molding elements endwise in successsion, means for supplying a thin sheet of thermoplastic material to said molding elements in a position overlying the cavities therein, means for heating the sheet to render it deformable, means for clamping said sheet against said molding elements and having apertures therein communicating with said cavities, means for introducing gas under pressure through said apertures for deforming said sheet into conformity with said mold cavities to form a plurality of receptacles in said sheet, a filling device adjacent to said molding elements and communicating with said apertures for introducing fluent material at superatmospheric pressure through said apertures into said receptacles to fill them, and means adjacent to said filling device for applying a cover sheet to said sheet of thermoplastic material and bonding them together around the peripheries of said receptacles to close the latter.

9. An apparatus for forming packages containing fluent material comprising a plurality of molding elements connected in end-to-end relation, each molding element having a plurality of mold cavities therein provided with porous walls to enable gas to flow therethrough, means for moving said molding elements endwise in succession, means for supplying a thin sheet of thermoplastic material to said molding elements in a position overlying the cavities therein, means for heating the sheet to render it deformable, a filling head adjacent to said molding elements, said head having means thereon for clamping said sheet against a mold element around the peripheries of the cavities therein and means for introducing fluent material under pressure against said sheet to deform it to fit said mold cavities, form receptacles therein and fill them, and means adjacent to said filling device for applying a cover sheet to said sheet of thermoplastic material and bonding them together around the peripheries of said receptacles to close the latter.

10. The apparatus set forth in claim 9 comprising means for subjecting the porous walls of the mold cavities to sub-atmospheric pressure to aid in deforming said sheet of thermoplastic material during filling with said fluent material.

11. The apparatus set forth in claim 9 comprising means on said means for applying and bonding said cover sheet for cutting said sheets to separate the receptacles in one molding element from the receptacles in adjacent molding elements.

12. In an apparatus for forming packages containing fluent materials a mold element comprising a tray-like member having side and end walls, wall elements of porous material dividing said tray-like member into a plurality of similar mold cavities and openings in said tray-like member to allow gas to flow through said wall elements and said member.

13. The mold element set forth in claim 12 in which said wall elements are in inclined relation to each other and to the bottom of said tray-like member to form generally wedge-shaped mold cavities.

14. The mold element set forth in claim 12 comprising reinforcing ribs in said tray-like member supporting said wall elements, said wall elements and the walls of said tray-like member having their upper edges substantially in a common plane.

15. The apparatus set forth in claim 12 in which a plurality of said mold elements are mounted on the periphery of a wheel member and comprising means supporting said wheel member for rotation about its axis.

References Cited in the file of this patent

UNITED STATES PATENTS

| | | |
|---|---|---|
| 2,199,210 | Scherer | Apr. 30, 1940 |
| 2,335,978 | Vogt | Dec. 7, 1943 |
| 2,387,747 | Cowley | Oct. 30, 1945 |
| 2,497,212 | Donofrio | Feb. 14, 1950 |
| 2,546,059 | Cloud | Mar. 20, 1951 |
| 2,663,128 | Stirn et al. | Dec. 22, 1953 |
| 2,712,717 | Keller | July 12, 1955 |

UNITED STATES PATENT OFFICE
CERTIFICATE OF CORRECTION

Patent No. 2,949,713                                August 23, 1960

Clarence W. Vogt

It is hereby certified that error appears in the printed specification of the above numbered patent requiring correction and that the said Letters Patent should read as corrected below.

Column 7, line 50, strike out "plying pneumatic pressure to said material in said cham-" and insert the same after "ap-" in line 48, same column.

Signed and sealed this 31st day of January 1961.

(SEAL)
Attest:

KARL H. AXLINE
Attesting Officer

ROBERT C. WATSON
Commissioner of Patents